United States Patent [19]

Paterson et al.

[11] Patent Number: 5,781,126
[45] Date of Patent: Jul. 14, 1998

[54] GROUND PROXIMITY WARNING SYSTEM AND METHODS FOR ROTARY WING AIRCRAFT

[75] Inventors: Noel S. Paterson, Woodinville; Gary A. Ostrom, Bellevue; Alden L. Loos, Seattle, all of Wash.

[73] Assignee: AlliedSignal Inc., Morristown, N.J.

[21] Appl. No.: 844,117

[22] Filed: Apr. 29, 1997

Related U.S. Application Data

[60] Provisional application No. 60/022,081, Apr. 29, 1996.

[51] Int. Cl.⁶ .................................................. G08B 23/00
[52] U.S. Cl. .......................... 340/970; 340/945; 340/946; 340/977; 73/178 H; 73/178 T; 244/17.11; 701/4; 701/5
[58] Field of Search ........................ 340/945, 970, 340/946, 977; 73/178 H, 30.01, 178 T; 244/17.11, 17.13; 701/4, 5

[56] References Cited

U.S. PATENT DOCUMENTS

| | | |
|---|---|---|
| 3,715,718 | 2/1973 | Astengo .................................. 340/970 |
| 3,925,751 | 12/1975 | Bateman et al. ..................... 340/967 |
| 3,934,221 | 1/1976 | Bateman et al. ..................... 340/970 |
| 3,934,222 | 1/1976 | Bateman et al. ..................... 340/970 |
| 3,936,796 | 2/1976 | Bateman et al. ..................... 340/970 |
| 3,944,968 | 3/1976 | Bateman et al. ..................... 340/970 |
| 3,947,808 | 3/1976 | Bateman ................................ 340/970 |
| 3,947,810 | 3/1976 | Bateman et al. ..................... 340/970 |
| 3,958,218 | 5/1976 | Bateman ................................ 340/970 |
| 3,958,219 | 5/1976 | Bateman et al. ..................... 340/970 |
| 4,029,271 | 6/1977 | Murphy et al. ..................... 244/17.13 |
| 4,030,065 | 6/1977 | Bateman ................................ 340/970 |
| 4,060,793 | 11/1977 | Bateman ................................ 340/970 |
| 4,063,073 | 12/1977 | Strayer .................................. 701/120 |
| 4,215,334 | 7/1980 | Bateman ................................ 340/970 |
| 4,224,669 | 9/1980 | Brame ....................................... 701/8 |
| 4,263,804 | 4/1981 | Seemann .............................. 73/30.01 |
| 4,319,218 | 3/1982 | Bateman ................................ 340/970 |
| 4,528,564 | 7/1985 | Trampnau ............................ 340/946 |
| 4,551,723 | 11/1985 | Paterson .............................. 340/946 |
| 4,567,483 | 1/1986 | Bateman et al. ..................... 340/970 |
| 4,603,388 | 7/1986 | Griffith et al. ........................... 701/4 |
| 4,642,775 | 2/1987 | Cline et al. ............................ 701/200 |
| 4,646,244 | 2/1987 | Bateman et al. ..................... 701/301 |

(List continued on next page.)

FOREIGN PATENT DOCUMENTS

| | | | |
|---|---|---|---|
| 43 04 561 A1 | 8/1994 | Germany | B64D 45/04 |
| 2 266 286 | 10/1993 | United Kingdom | B64D 45/04 |

OTHER PUBLICATIONS

Kei Kuno, "Past, Present and Future of Alert Systems for Abnormal Closure to Ground," dated Mar., 1993 with attached English translation.

"Proceedings of the National Technical Meeting," The Institute of Navigation, Anaheim, California dated Jan. 20–23, 1987 (4 pages).

Jean-Francis Manfroy and Lothar J. Taylor, "A New Approach To CFIT Prevention: GCAS Ground Collision Avoidance System," Dassault Electronique, Rockwell Avionics, dated Nov. 1995 (12 pages).

*Primary Examiner*—Jeffery A. Hofsass
*Assistant Examiner*—Benjamin C. Lee

[57] ABSTRACT

The present invention provides ground proximity warning system and method for aircraft, particularly rotary wing aircraft such as helicopters. The warning system generally includes a barometric altitude rate detector, such an altimeter and a rate circuit, disposed to detect the rate of change of the barometric altitude of the aircraft. A controller is coupled to the detector for receiving the barometric altitude rate signals and adjusting the signals based on the ground effect from the main rotors when the aircraft is near the ground. Typically, the controller decreases the barometric altitude rate signals to compensate for the apparent increase in barometric altitude rate caused by ground effects. This reduces the number of nuisance warnings that may otherwise occur during takeoffs, landings or other low altitude flight conditions.

24 Claims, 7 Drawing Sheets

U.S. PATENT DOCUMENTS

| | | | |
|---|---|---|---|
| 4,675,823 | 6/1987 | Noland | 701/300 |
| 4,769,645 | 9/1988 | Paterson | 340/946 |
| 4,818,992 | 4/1989 | Paterson | 340/970 |
| 4,894,655 | 1/1990 | Joguet et al. | 340/988 |
| 4,903,212 | 2/1990 | Yokouchi et al. | 701/216 |
| 4,912,645 | 3/1990 | Kakihara et al. | 340/988 |
| 4,914,436 | 4/1990 | Bateman et al. | 340/970 |
| 4,914,733 | 4/1990 | Gralnick | 340/961 |
| 4,954,959 | 9/1990 | Moroto et al. | 701/211 |
| 4,980,684 | 12/1990 | Paterson et al. | 340/970 |
| 5,155,688 | 10/1992 | Tanaka et al. | 701/221 |
| 5,157,615 | 10/1992 | Brodegard et al. | 701/301 |
| 5,257,195 | 10/1993 | Hirata | 701/216 |
| 5,265,025 | 11/1993 | Hirata | 701/213 |
| 5,293,163 | 3/1994 | Kakihara et al. | 340/995 |
| 5,293,318 | 3/1994 | Fukushima | 701/216 |
| 5,337,242 | 8/1994 | Yamamoto et al. | 701/208 |

GROUND PROXIMITY WARNING SYSTEM AND METHODS FOR ROTARY WING AIRCRAFT

CROSS-REFERENCE TO RELATED APPLICATIONS

This application claims priority from U.S. provisional application Ser. No. 60/022,081 filed Jul. 29, 1996.

This application is related to concurrently filed and commonly assigned patent applications entitled "Air-Ground Logic System and Method For Rotary Wing Aircraft", Ser. No. 08/846,962 filed Apr. 29, 1997, and "Systems and Methods for Generating Altitude Callouts for Rotary Wing Aircraft", Ser. No. 08/844,116 filed Apr. 29, 1997, the complete disclosures of which are incorporated herein by reference.

BACKGROUND OF THE INVENTION

The present invention relates generally to ground proximity warning devices and more particularly to systems and methods for computing barometric altitude rates for rotary wing aircraft for use in such ground proximity warning devices.

Ground proximity warning systems provide aural and visual warnings of aircraft descent after takeoffs, landings, during a go-around after a missed approach and other low altitude flying conditions. These systems typically detect altitude loss by computing the barometric altitude (MSL) rate change. The radio altitude or altitude above ground level (AGL) is then determined with a radio altimeter. The warning device typically issues a number of aural or visual warnings if the altitude loss is excessive for the radio altitude at which the aircraft is flying. For example, one such system, compares the accumulated altitude loss after takeoff of the aircraft, and generates a warning if the altitude loss exceeds a predetermined value before a threshold altitude has been reached. Examples of such a system are disclosed in commonly assigned U.S. Pat. Nos. 3,946,358, 3,947,808, and 4,818,992, the complete disclosures of which are incorporated herein by reference. Another type of warning system warns the pilot in the event that the aircraft is descending too rapidly, particularly on approach to a landing. Examples of this type of warning system are disclosed in commonly assigned U.S. Pat. Nos. 3,958,358, 4,215,334, and 4,551,723, the complete disclosures of which are also incorporated herein by reference.

The present invention is particularly concerned with ground proximity warning devices for rotary wing aircraft, such as helicopters. Rotary wing aircraft present unique challenges when employing sensors to detect the aircraft's proximity to the ground. For example, the "ground effect" from the main rotors of a helicopter may cause significant distortion of barometric altitude rate information during landings and/or takeoffs. The "ground effect" is a phenomenon that occurs near the ground in which the air between the main rotors and the ground is compressed, which results in an apparent increase in barometric altitude rate even though the actual rate may be stable or decreasing. This is because the air becomes more dense as it is compressed, which provides a signal to the barometric altimeter that the helicopter has descended to a lower altitude corresponding with the denser air. Thus, the detected altitude descent rate increases even though the actual rate may be stable or decreasing. Consequently, warning systems designed for transport aircraft may generate nuisance warnings during certain normal operational conditions of a rotary wing aircraft, and provide no warning or an inadequate warning during other flight conditions.

SUMMARY OF THE INVENTION

The present invention provides ground proximity warning systems and methods for aircraft, particularly rotary wing aircraft such as helicopters. The warning system generally includes a barometric altitude rate detector, such as an altimeter and a rate circuit or other suitable detection device, disposed to detect the rate of change of the barometric altitude of the aircraft. A controller is coupled to the detector for receiving the barometric altitude rate signals and adjusting the signals based on the ground effect from the main rotors when the aircraft is near the ground. Typically, the controller decreases the barometric altitude rate signals to compensate for the apparent increase in barometric altitude rate caused by ground effects. This reduces the number of nuisance warnings that may otherwise occur during takeoffs, landings and other low altitude flight conditions.

In a specific configuration, the controller includes an engine power detector disposed to detect the power generated by the aircraft. Preferably, the power detected is an indication of engine torque. For dual engine aircraft, both engine torques are preferably summed to determine the total engine torque generated by the rotary wing aircraft. A control circuit or control software is coupled to the torque detector and configured to scale the barometric altitude rate signals based on the total engine torque. During descent to landing or ascent after take-off, before the aircraft has reached a certain altitude, the total engine torque is typically below a certain value. At this point, the barometric altitude rate computed from the barometric altimeter can be used directly because of minimal ground effect distortion. While the pilot is arresting the descent prior to landing or during take-off, however, the total engine torque rises significantly. In fact, Applicants have found that the total engine torque of some rotary wing aircraft, such as the Bell 212, rises substantially inversely proportional to the apparent increase in barometric altitude rate due to ground effects. Accordingly, the control circuit or software decreases the barometric altitude rate signals substantially proportional to the increase in total engine torque to minimize the effect ground effect has on these barometric altitude rate signals.

In a preferred embodiment, the control circuit multiplies the detected barometric altitude rate by a constant based on the total engine torque of the aircraft, and other constants, such as minimum and maximum torque values (i.e., constants) for the particular aircraft. In an exemplary embodiment, the warning system further includes one or more filters coupled to the control circuit for filtering out noise signals for different flight conditions, i.e., depending on the amount of expected noise signals, the desire to minimize interruptions and other factors. In one embodiment, a switch automatically toggles between first and second filters having different ranges. For example, the first filter may allow more signals to pass through so that it can be used for flight conditions where it is desirable that the control circuit be more sensitive to rapid changes in the altitude change. The second filter may be more restrictive so that it can be used during, for example, landing because this is generally a more stable flight condition, and it is often desirable to eliminate the noise signals so that the pilot can concentrate on the landing.

The warning system will preferably include one or more switches or equivalent mechanisms for enabling and disabling the controller during certain flight conditions. For example, the switches will preferably disable the controller during flight conditions where ground effect will not significantly alter the barometric altitude rate signals generated by the altimeter, or during flight conditions where the pilot desires to minimize interruptions. In a preferred embodiment, one of the switches will disable the controller when the aircraft is above a specified altitude, preferably about 200 feet AGL. Other flight conditions for disabling the controller may include the airspeed of the aircraft (e.g., disabling the controller when the airspeed is below a threshold value such as 40 knots), the total engine torque of the aircraft (e.g., disabling the controller when the total engine torque is below a threshold torque value), and the like. In addition, the invention may include other disabling switches, such as a switch to disable the controller when the aircraft computes the inertial vertical speed.

In an exemplary embodiment, the present invention further includes a ground proximity warning device coupled to the controller and having an alarm for generating a visual and/or aural warning based on at least the barometric altitude rate of the aircraft. This ground proximity warning device can provide a variety of warnings to the pilot(s), such as excessive descent rate, excessive closure to terrain, altitude loss after take-off, unsafe terrain clearance, altitude awareness callouts, and the like. In one embodiment, the warning system includes a descent detector for generating signals representing the descent rate of the aircraft. The ground proximity warning device is responsive to the barometric altimeter for generating a warning if the relationship between the altitude and the descent rate of the aircraft approaches a threshold level.

In another embodiment, the system includes an altitude loss detector and a warning device responsive to the altimeter and the altitude loss signal for detecting an excessive altitude loss and for providing a warning if the altitude loss exceeds the threshold value. This system is particularly useful to alert pilots of an inadvertent descent towards terrain after take-off or missed approach. In yet another embodiment, the warning system includes a closure rate detector for providing signals representative of the closure rate between the aircraft and terrain, and an airspeed detector for providing signals representative of the airspeed. In this embodiment, the warning device preferably generates a warning if the altitude is below a threshold altitude value, the closure rate is above a threshold closure rate value and the airspeed is greater than a threshold airspeed value.

In all of the above embodiments, the barometric altitude rate will be adjusted for ground effects, if necessary, by the controller of the present invention. This reduces the nuisance warnings during certain normal operational conditions of the rotary wing aircraft, and ensures that ground proximity warnings are applied during other flight conditions that warrant these warnings.

DETAILED DESCRIPTION OF THE PREFERRED EMBODIMENT

Figure 1:
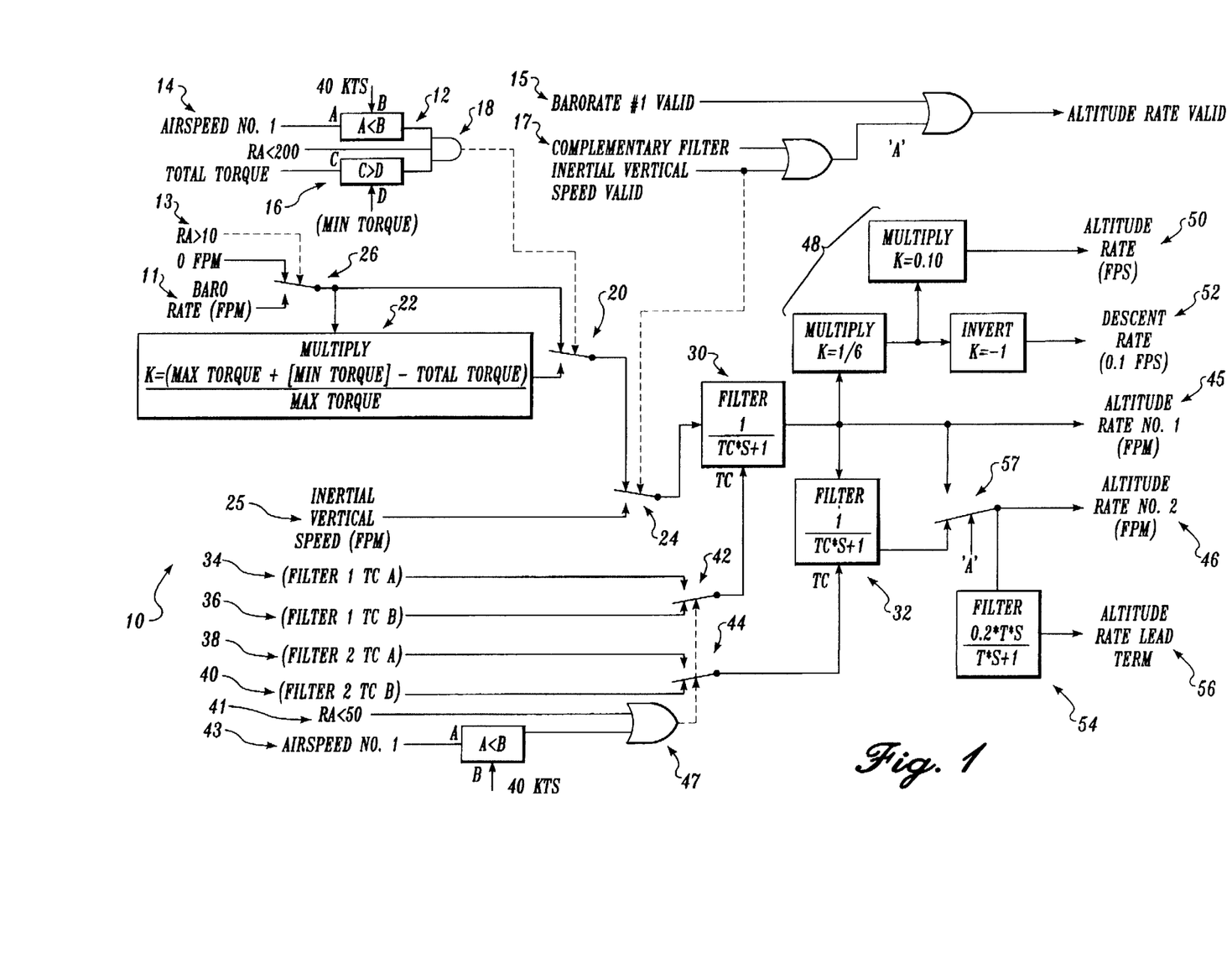
FIG. 1 is a functional block diagram of a controller for determining barometric altitude rate and adjusting this rate based on total engine torque to compensate for ground effects.
Figure 2:
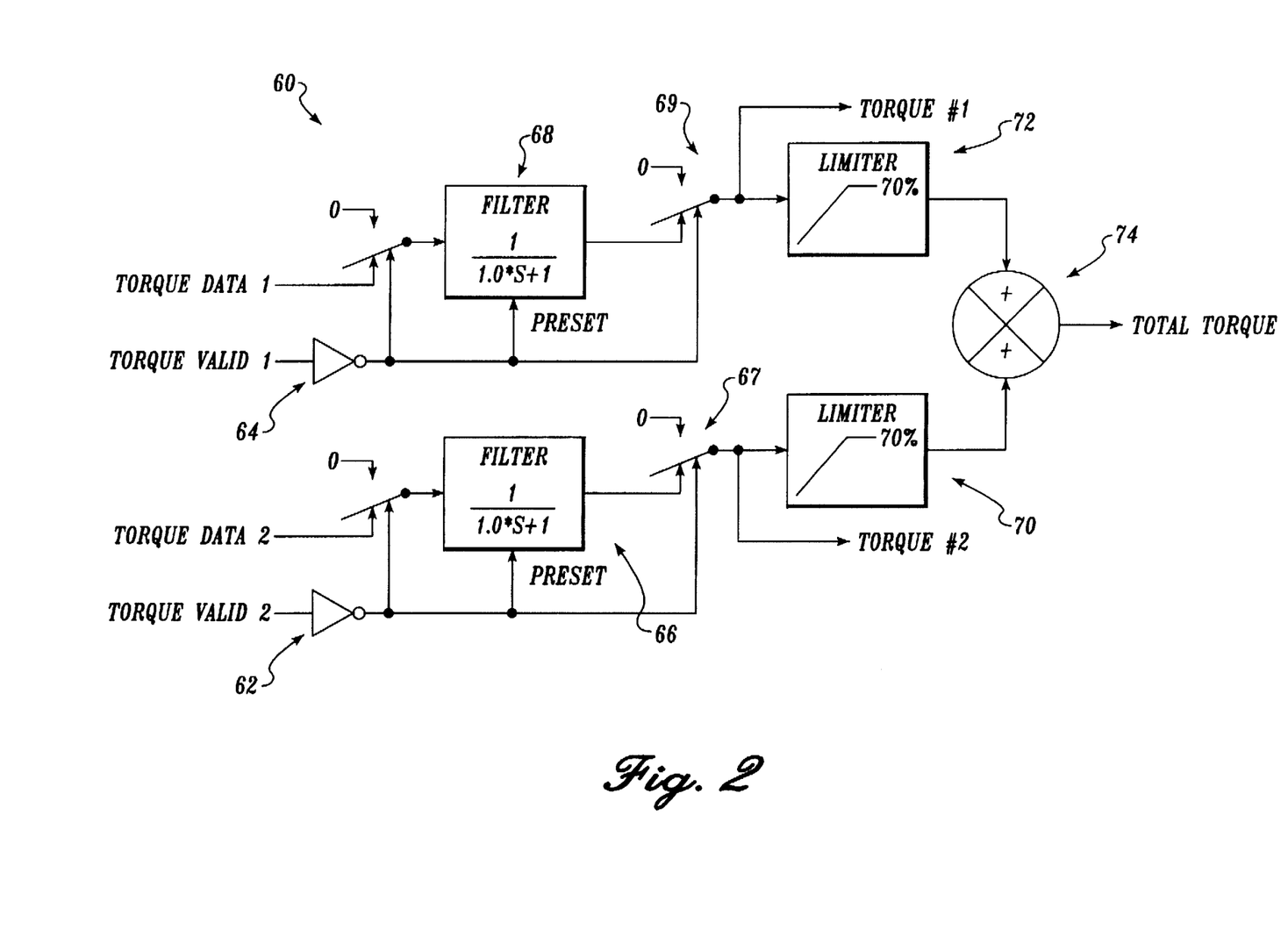
FIG. 2 is a block diagram of an exemplary circuit for determining the total engine torque of an aircraft.

Referring to the drawings in detail, wherein like numerals indicate like elements, a control system 10 for determining barometric altitude rate and adjusting this rate based on total engine torque to compensate for ground effects is illustrated in FIGS. 1 and 2. FIGS. 3–7 illustrate exemplary embodiments of ground proximity warning devices 100 and 200 that make use of control system 10. Warning device 100 compares the altitude above ground of the aircraft with the descent rate, preferably barometric descent rate, and issues a warning if the descent rate is excessive for the altitude at which the aircraft is flying. Warning device 200 determines whether the aircraft has lost an excessive amount of altitude for the altitude at which it is flying. Of course, it will be recognized by those skilled in the art that the control system and method of the present invention may be used with a variety of other ground proximity warning devices. The invention is particularly useful with these types of warning devices because the change in barometric altitude is an integral part of the warning.

In an exemplary embodiment, control system 10 will form a portion of a larger Ground Proximity Warning System (GPWS) which provides warnings to the pilot when the aircraft is in danger of impacting the earth. The aircraft data is collected from various sensors on the aircraft and processed in a digitally controlled warning computer to determine if the aircraft is in danger. Visual and aural outputs advise the pilot of dangerous situations and indicate if the system is operational. One such warning computer is the AlliedSignal MKVII Warning Computer for a rotary wing aircraft manufactured by AlliedSignal Avionics Inc. of Redmond, Wash.

The GPWS preferably includes a number of warning modes to provide aural and visual alerts and warnings for unsafe proximity to terrain, deviation below ILS glide slope, excessive bank angle, onset of severe wind shear, altitude awareness, etc. Mode one, for example, provides pilots with alert/warnings for high descent rates into terrain. In this mode, a warning device compares the altitude above ground of the aircraft with the descent rate, preferably barometric descent rate, and issues a warning if the descent rate is excessive for the altitude at which the aircraft is flying. A more complete description of an exemplary warning device for indicating excessive descent rate can be found in U.S. Pat. No. 4,551,723, the complete disclosure of which has previously been incorporated herein by reference. Mode two provides warnings for excessive closure rates to terrain with respect to altitude (AGL), phase of flight and speed. Mode three provides warnings for significant altitude loss after takeoff or low altitude go around. A complete description of this system can be found in U.S. Pat. No. 4,818,992, the complete disclosure of which has previously been incorporated herein by reference.

Mode four provides alerts and warnings for insufficient terrain clearance with respect to phase of flight and speed.

Mode five provides glide slope alerts when the airplane is below 1,000 ft. AGL with the gear down and the glide slope deviation exceeds a threshold number of dots below the ILS glide slope. Mode six provides callouts for descent through predefined altitudes (AGL). In particular, mode six is utilized during autorotation when the aircraft has lost all or partial engine power.

The warning devices 100, 200 according to the invention are illustrated in logical block diagrams as a series of gates, comparators and the like for purposes of illustration. However, it should be understood that the actual implementation of the logic can be other than as shown in the drawings, with various digital and analog implementations being possible. Alternatively, the implementation of the logic may be carried out by the computer readable code of software programs. The signals used by the system as described include radio altitude, barometric altitude rate and airspeed, along with various validity signals. Depending on the type of aircraft in which the warning system is installed, the signals shown in the figures can be obtained from individual instruments, such as a barometric altimeter 112, 212, a barometric rate circuit 114, 214, a radio altimeter 116, 216 and an airspeed detector 218, which may be an air data computer or an airspeed indicator, and other discrete elements indicating whether the landing gear is up or down, etc. (see FIGS. 3 and 6). Alternatively, the signals can be obtained from a digital data bus in certain newer aircraft.

Referring to FIG. 1, control system 10 will now be described in detail. As mentioned previously, control system 10 adjusts the barometric altitude rate signals based on total engine torque to compensate for ground effects on the aircraft. A barometric altitude rate signal is first generated from a suitable detection device 11, such as a barometric altimeter and a rate circuit (see FIGS. 3 and 7). The signal from the detection device 11 is inhibited by a signal from a 10 foot comparator 13 when the aircraft is below 10 feet above ground to minimize nuisance warnings. When the aircraft is above 10 feet AGL, the signal 26 is scaled by a control function 22. In addition, detection device 11 is inhibited by a BARO RATE VALID signal 15 in the event of a defective barometric altimeter or a barometric rate circuit and a Complementary Filter Valid 17 in the event of a failure in the inertial data sources.

Control function 22 preferably scales the detected barometric rate signal 26 based on the total engine torque. Typically, an inversely proportional relationship exists between changes in engine torque and changes in altitude due to ground effect. During descent to landing or ascent after take-off, before the aircraft has reached a certain altitude, the total engine torque is usually below a certain value. At this point, the barometric altitude rate computed from the barometric altimeter can be used directly because of minimal ground effect distortion. While the pilot is arresting the descent prior to landing or during take-off, however, the total engine torque rises significantly. In fact, Applicants have found that the total engine torque of some rotary wing aircraft rises substantially inversely proportional to the apparent increase in barometric altitude rate due to ground effects. Accordingly, the control circuit or software decreases the barometric altitude rate signals substantially proportionally to the increase in total engine torque to minimize the effect ground effect has on these barometric altitude rate signals.

In a preferred configuration, the control function 22 multiplies the detected barometric altitude rate 26 by a constant based on the total measured engine torque and minimum and maximum torque values for the specific aircraft. Preferably, the constant is determined with the following formula:

$$K = ((\text{Max Torque} + \text{Min Torque}) - \text{Total Torque})/\text{Max Torque}$$

The maximum torque is a constant, usually equal to about 100%. The minimum torque is a constant, usually equal to about 10 to 40% and preferably about 25%. The constant Min Torque is derived from the Total Torque value at which the Barometric Rate Scaling should begin deviating below 1.0.

Referring to FIG. 2, a preferred torque circuit 60 for determining total engine torque will now be described. As shown, first and second torque detectors (not shown) detect the engine torque of engine #1 and engine #2 respectively, and input signals representing these values. The torque detectors are inhibited by TORQUE VALID signals 62, 64 in the event of defective torque detectors. The output of the torque detectors are then each applied to a low pass filter 66, 68 to filter noise from the detection signals. A pair of switches 67, 69 ensure that no erroneous data stored in filters 66, 68 is passed to the output. In this implementation, the output of filters 66, 68 are then each applied to a limiter 70, 72 that limits data above a threshold amount to prevent out of range data of Total Torque. The output of filters 70, 72 are combined into a mixer 74 that outputs the summed signals to control system 20.

System 10 includes a number of disabling switches to disable the system if the aircraft is in a flight condition where ground effects are negligible or non-existent. Specifically, system 10 includes at least three comparators 12, 14, 16 for determining if the airspeed is less than 40 knots (comparator 12), if the aircraft is below 200 feet AGL (comparator 14) and if the total engine torque of the aircraft exceeds a minimum torque value (comparator 16). The outputs of comparators 12, 14, 16 are applied to the input of an AND gate 18 to determine whether to activate a switch 20 that disables or enables control function 22. Thus, if the aircraft is above 200 feet AGL, flying faster than 40 knots, or if the torque value is below a minimum torque value, switch 20 is moved upwards as shown in FIG. 1 to disable control function 22. Comparator 16 can be used to disable the function for applications where barometric altitude rate correction is not required. In that case, Min Torque is set to greater than Max Torque. This effectively ensures that the control function does not operate when the aircraft is flying in conditions in which ground effects are negligible. Control system 20 may include additional flying conditions that disable the control function 22 so that the barometric altitude rate detected is presumed valid. For example, if the aircraft has an inertial vertical speed detector 25, a second switch 24 will be activated to disable control function 22 and to disable the barometric altimeter circuit 26. In this way, the ground proximity warning devices 100, 200 will use the inertial vertical speed for determining whether to issue a warning to the pilot.

Control system 10 further includes one or more filters coupled to the output of control function 22 for filtering out noise signals for different warning functions. In this embodiment, first filter 30 will generally have a faster response and it will allow more signals (and noise) to pass through than second filter 32. Thus, first filter 30, for example, may be employed after take-off so that the control system 20 is more sensitive to rapid changes in the altitude change. Second filter 32 may be used during other flight conditions when it is desirable to minimize noise signals.

Control system 20 preferably includes a number of time constants to vary the duration between altitude rate signals generated by the system. This duration is varied automatically, and will typically depend on flight conditions and the type of aircraft. For example, when the aircraft is in cruise at a relatively high velocity and a relatively high altitude, a slower (i.e., longer duration) time constant may be desired. On the other hand, during takeoff or landing, a shorter time constant may be desired. As shown in FIG. 1, each filter 30, 32 includes at least a pair of time constant functions 34, 36 and 38, 40, respectively. A pair of switches 42, 44 toggle between the time constant functions for each filter. In the preferred configuration, two comparators 41, 43 determine if the airspeed is below 40 knots (comparator 43) and if the aircraft is above 50 feet AGL (comparator 41). The outputs of comparators 43, 45 are applied to the input of an OR gate 47 to determine whether to toggle switches 42, 44 between the various time constants. Thus, if the aircraft is below 50 feet AGL or flying at an airspeed less than 40 knots, switches 42, 44 will be toggled to longer time constants 34, 38.

Control system 20 will preferably be configured to generate a variety of different altitude rate signals to assist the pilot in determining whether the aircraft is in a hazardous or unsafe flight condition. As shown, each filter 30, 32 is coupled to an altitude rate generator 45, 46 that receives the signals passing through the filter and generates a barometric altitude rate in feet/minute. In addition, control system 20 includes a conversion circuit 48 for converting the barometric altitude rate into feet/second and into a descent rate (i.e., the inverse of the altitude rate) in 0.1 feet/second. A high pass filter 54 is coupled to the output of a switch 57 for receiving the signals from the operable filter 30 or 32. The high pass filter 54 generates an altitude rate lead term 56 for determining the altitude acceleration rate.

Figure 3:
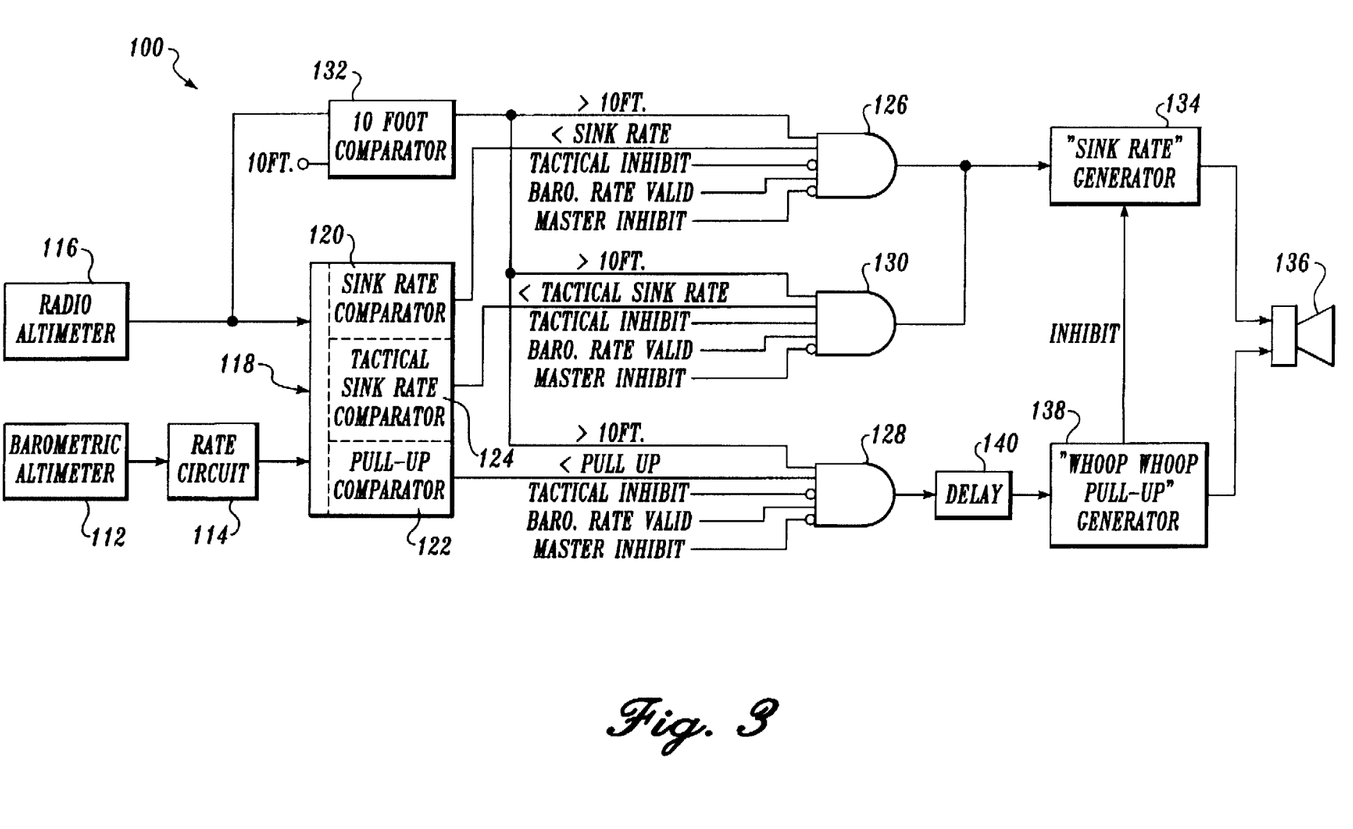
FIG. 3 is a logical block diagram of an excessive descent rate warning system utilizing the barometric altitude rate computed with the system of FIG. 1.
Figure 4:
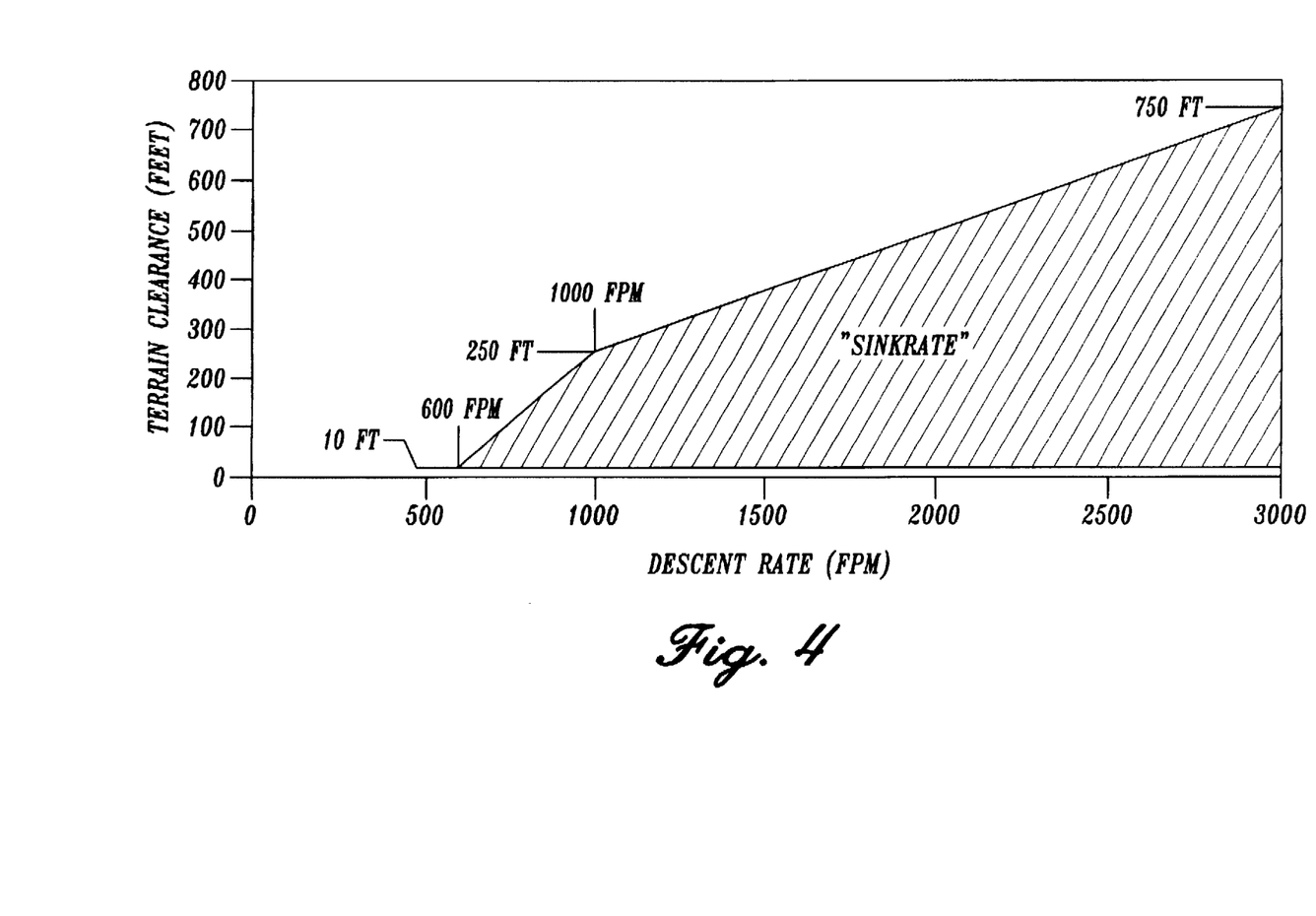
FIG. 4 is a graph of the descent rate required to generate a first warning as a function of radio altitude.
Figure 5:
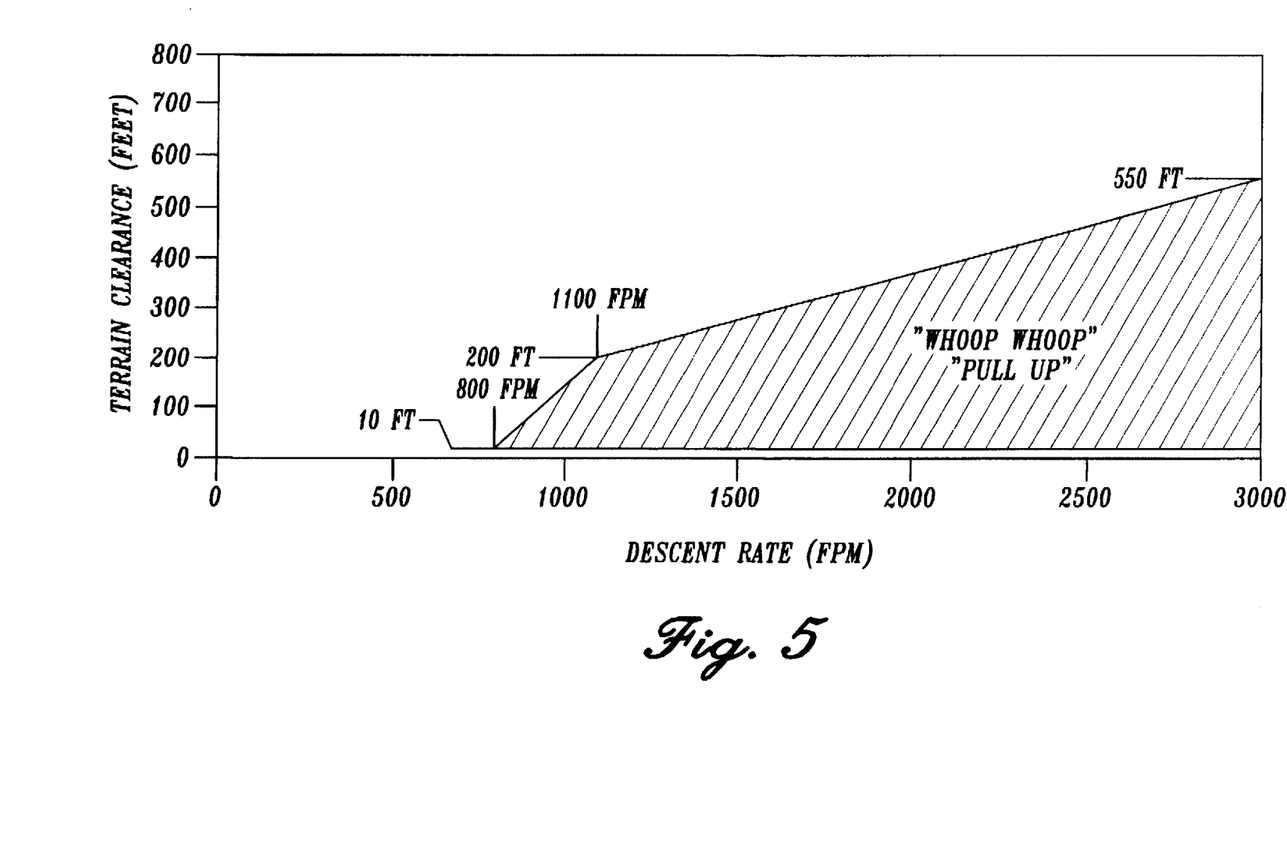
FIG. 5 is a graph of the descent rate required to generate a second warning as a function of radio altitude.

FIGS. 3–5 illustrate one embodiment of the invention, in which a ground proximity warning device 100 compares the altitude above ground of the aircraft with the descent rate, preferably barometric descent rate, and issues a warning if the descent rate is excessive for the altitude at which the aircraft is flying. The barometric signal is compensated for ground effects from control system 10 as discussed above. The comparison function is provided by a mode comparator 118, which in the present embodiment, compares the radio altitude signal from the altimeter 116 with the barometric altitude rate signal from the rate circuit 114 under three different criteria. In the illustrated embodiment, the three different criteria are defined by three sections of the comparator 118. These sections include a sink rate comparator 120, a pull-up comparator 122 and a tactical sink rate comparator 124, all shown as being part of the comparator 118 for purposes of illustration; however, three separate comparators could also be used.

The output of each of the comparators 120, 122 and 124 is applied to an input of one of three AND gates 126, 128 and 130, respectively. The AND gates 126, 128, and 130 are enabled under various conditions, with the AND gates 126 and 128 being inhibited during tactical operation by a tactical inhibit signal, which may be obtained, for example, from a discrete circuit such as a tactical mission switch or a weapons arming switch. Conversely, the AND gate 130 is enabled by the TACTICAL INHIBIT signal during tactical phases of operation, and consequently, the AND gates 126 and 128 control the generation of a warning during non-tactical phases of flight, and the AND gate 130 controls the generation of the warning during tactical maneuvers. In addition, all three of the AND gates 126, 128 and 130 are inhibited by a 10 foot comparator 132, a BARO RATE VALID signal and a MASTER INHIBIT signal similar to the control system 10 discussed above.

For example, if the aircraft is operating in a non-tactical mode of operation, the gates 126 and 128 will be enabled and the gate 130 will be inhibited. Under these conditions, if the combination of descent rate and altitude above ground is such that the warning criteria established by the sink rate comparator 120 are exceeded, the sink rate comparator 120 will apply an enabling signal to the AND gate 126, thereby causing the AND gate 126 to apply a warning initiation signal to a SINK RATE generator 134. The SINK RATE generator 134 is preferably a digital voice generator that is responsive to the warning initiation signal from the AND gate 126 and generates a specific voice warning that is applied to a transducer, such as an earphone or a loudspeaker 136, either directly or indirectly, for example, through the intercom system of the aircraft. The warning should be a specific warning to advise the pilot of the specific condition causing the warning to be generated, and it has been found that the words "SINK RATE" are particularly useful for communicating the problem to the pilot.

In the event that the relationships between the descent rate and the altitude of the aircraft above ground is such that the warning criteria established by the pull-up comparator 122 are exceeded, the pull-up comparator 122 applies an enabling signal to the AND gate 128. Typically, exceeding the warning criteria established by the pull-up comparator 122 is indicative of a more dangerous flight condition than exceeding the criteria established by the sink rate comparator 120. Consequently, a more urgent warning is provided under these conditions. In the illustrated embodiment, the more urgent warning is generated by WHOOP-WHOOP PULL-UP generator 138, which is preferably a digital voice generator also. The generator 138 may either be separate from the generator 134, or preferably, incorporated in the same unit. A more complete description of this ground proximity warning device 100 can be found in U.S. Pat. No. 4,551,723, the complete disclosure of which has been previously incorporated herein by reference.

Figure 6:
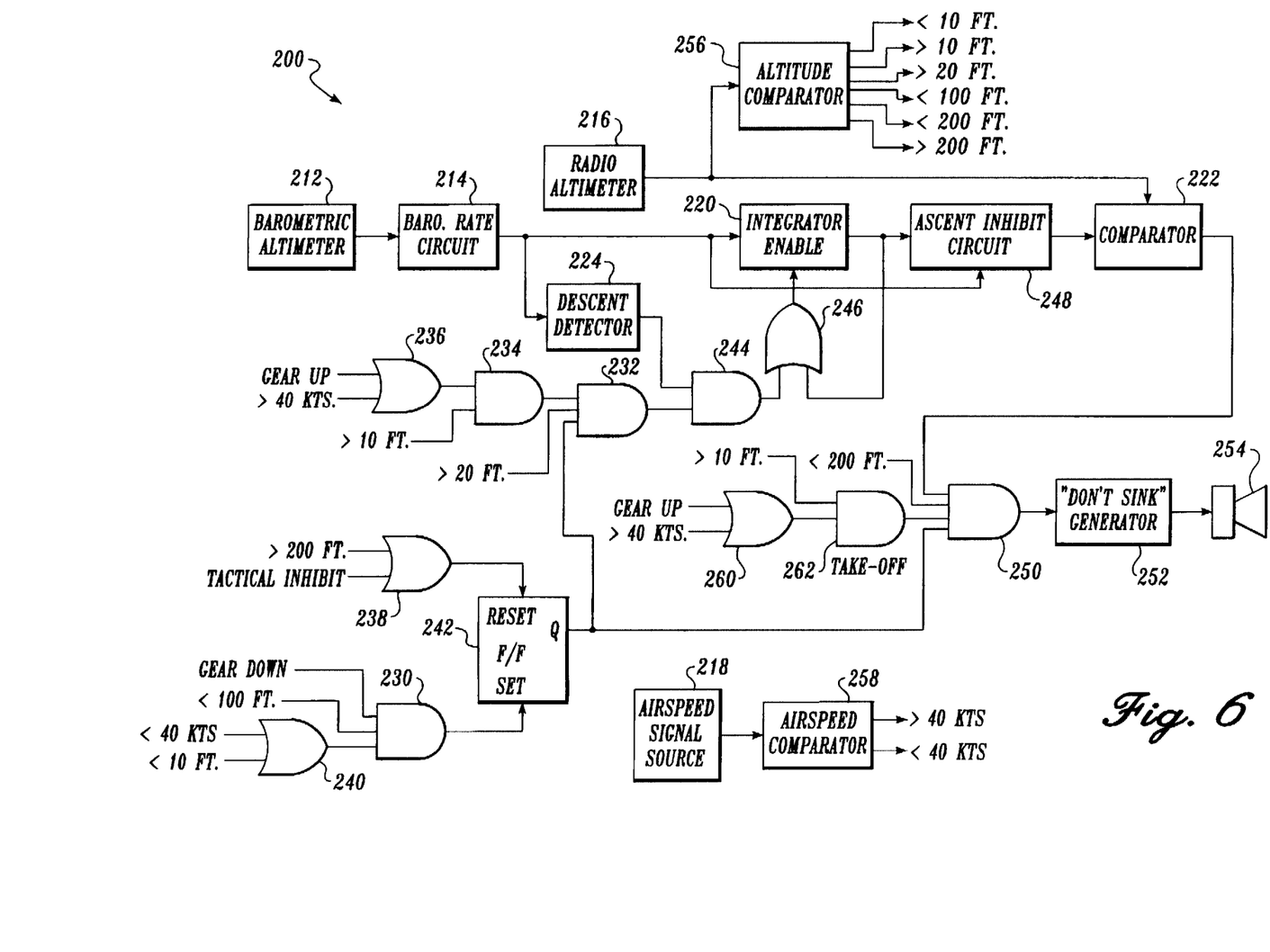
FIG. 6 is a functional block diagram of a ground proximity warning system for excessive altitude loss after take-off utilizing the barometric altitude rate computed in the system of FIG. 1.
Figure 7:
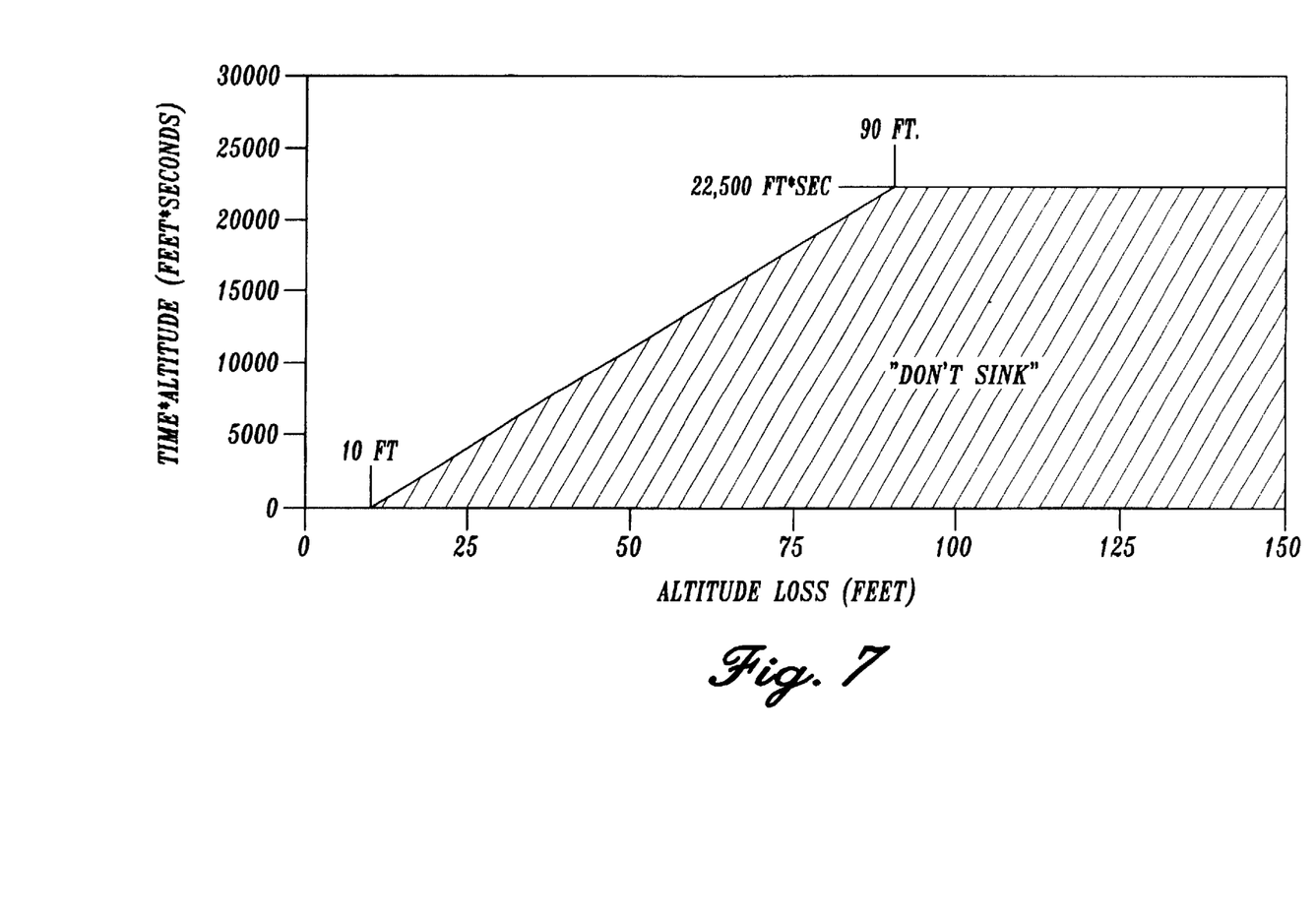
FIG. 7 is a graph illustrating the relationship between radio altitude and altitude loss that the aircraft must attain to generate a warning.

FIGS. 6 and 7 illustrate another embodiment of the present invention in which a ground proximity warning device 200 determines whether the aircraft has lost an excessive amount of altitude for the altitude at which it is flying. As shown in FIG. 6, a barometric rate signal is integrated by an integrator 220 and applied to a comparator 222 when the aircraft is descending. The barometric rate signal may be obtained from the barometric rate circuit which differentiates the signals from the barometric altimeter 212, or from another suitable source. The barometric rate signal will then be applied to control system 10 to compensate for ground effects as discussed above. The function of the integrator 220 is to integrate the signal from the barometric rate circuit 214 to provide a signal representative of the altitude loss of the aircraft after take-off. Thus, the integrator 220 is preferably enabled only when a descent condition has been detected by a descent detector 224, and when a take-off logic or a go-around condition is indicated by take-off logic circuitry 232 which includes AND gates 230, 232, and 234, OR gates 236, 238 and 240, and a set-reset flip-flop 242. A take-off condition is preferably defined as being present when the landing gear of the aircraft is down, the aircraft is below 100 feet of radio altitude, and the airspeed of the aircraft is less than 40 knots or the radio altitude is less than 10 feet. Thus, if a take-off or go-around after a missed approach condition is indicated, and a descent is detected by the descent detector 224, an AND gate 244 is enabled and applies an enabling signal to the integrator 220 via an OR gate 246. The integrator 220 then integrates the barometric rate signal from the barometric rate circuit 214 to generate an altitude loss signal.

The altitude loss signal is applied to the comparator 222 via an ascent inhibit circuit 248. The comparator 222 generates a warning initiation signal when the altitude loss is excessive for the altitude at which the aircraft is flying, and applies it to an AND gate 250. Assuming that all of the other inputs to the AND gate 250 are enabled, the AND gate 250 applies the warning initiation signal to a voice warning generator 252, which may be a digital voice generator. The warning initiation signal causes the voice generator 252 to apply a voice message, such as, for example, "DON'T SINK", to a transducer such as an earphone or a loudspeaker 254 to inform the pilot of the specific hazardous flight condition being warned against. Although the output of the voice generator 252 is shown connected directly to the transducer 254, the voice generator may be connected either directly or indirectly to the transducer 254, preferably indirectly through the intercom system of the aircraft.

In operation, as the aircraft takes off, the landing gear is down, the altitude of the aircraft is below 100 feet and the speed of the aircraft is less than 40 knots. This enables the AND gate 230, and sets the flip-flop 242 to indicate a take-off mode, thereby applying enabling signals to the AND gates 232 and 250. The aircraft gains altitude and airspeed until the altitude of the aircraft above ground is greater than 20 feet and the speed of the aircraft exceeds 40 knots or the gear is raised. Under these conditions, the AND gate 232 is fully enabled by signals from the altitude and airspeed comparators 256 and 258, and by the gates 234 and 236. This enables the AND gate 244, and places it under the control of the descent detector 224.

As long as the aircraft continues to ascend, the descent detector 224 maintains the AND gate 244 and the ascent inhibit circuit 248 in an inhibited condition. However, if the aircraft descends, the descent detector detects a signal representative of a descent rate from the barometric rate circuit 214, and enables the AND gate 244 and the ascent inhibit circuit 248. Under these conditions, the integrator 220 integrates the barometric rate signal from the barometric rate circuit 214 to provide a signal representative of cumulative altitude loss to the comparator 222 via the ascent inhibit circuit 248. The comparator 222 compares the cumulative altitude loss with the radio altitude, and generates a warning initiation signal if the altitude loss exceeds a predetermined amount as determined by the radio altitude at which the aircraft is flying. The warning initiation signal is applied to the AND gate 250, and if the landing gear is up or the speed of the aircraft is in excess of 40 knots, and if the aircraft is flying between the altitudes of 10 feet and 200 feet AGL, as determined by the signal applied to the OR gate 260 and the AND gates 250 and 262, the warning will be generated.

The "DON'T SINK" warning will be repeated by the voice generator until the pilot takes corrective action to terminate the descent. Once this occurs, the barometric rate circuit 214 will provide a signal representative of an ascent condition, thereby inhibiting the ascent inhibit circuit 248 and the AND gate 244. The inhibiting of the ascent inhibit circuit 248 will cause the warning to be terminated; however, the integration of the barometric rate signal by the integrator 220 will not be terminated. The integrator 220 will be maintained in an enabled condition by the OR gate 246 which receives an enabling signal from the integrator 220 as long as there is a signal representative of a cumulative altitude loss present at the output of the integrator 220.

As the aircraft continues to ascend, the integrator 220 integrates the positive barometric rate signal from the barometric rate circuit 214 to thereby reduce the magnitude of the altitude loss signal present at the output of the integrator 220. If the aircraft begins to descend again, the integrator 220 adds any altitude loss to the altitude loss signal previously accumulated, and causes the comparator 222 to generate the warning ignition signal when the cumulative loss exceeds the maximum loss permitted for the altitude at which the aircraft is flying.

As the aircraft completes its mission and is on its approach to a landing, the aircraft will lower its landing gear and eventually drop below 100 feet, and if its airspeed drops below 40 knots or its altitude drops below 10 feet, the gate 230 will set the flip-flop 242 to thereby enable the gates 232 and 250. Consequently, in the event of a missed approach, if the pilot raises his gear or exceeds 40 knots and climbs above 10 feet of radio altitude, the gate 232 will again be enabled by the gates 234 and 236. This enables the warning generating system, and permits a warning to be generated in the event of an excessive altitude loss during the go-around. A complete description of this system can be found in U.S. Pat. No. 4,818,992, the complete disclosure of which has previously been incorporated herein by reference.

What is claimed is:

1. A warning system for aircraft comprising:
   a barometric altitude rate detector disposed to detect the barometric altitude of the aircraft and to generate signals representative of the barometric altitude rate; and
   a controller coupled to said detector for receiving said barometric altitude rate signals and including means for providing signals indicative of ground effects, the controller adjusting the barometric altitude rate signals based on said signals indicative of ground effects.

2. The warning system of claim 1 wherein the controller decreases the barometric altitude rate signals to compensate for an apparent increase in barometric altitude rate caused by ground effects.

3. The warning system of claim 1 further comprising a ground proximity warning device coupled to the controller, the warning device having an alarm for generating a warning based on at least the barometric altitude of the aircraft.

4. The warning system of claim 1 further comprising one or more filters for filtering out noise signals from the controller.

5. The warning system of claim 1 wherein the barometric altitude detection device comprises a barometric altimeter and a rate circuit.

6. The warning system of claim 1 further comprising:
   a descent detector for generating signals representative of the descent rate of the aircraft; and
   a ground proximity warning device responsive to said barometric altimeter for generating a warning if the relationship between the barometric altitude and descent rate of the aircraft approaches a threshold level.

7. The warning system of claim 1 further comprising:
   an altitude loss detector disposed to provide a signal representative of the altitude loss of the aircraft; and
   a ground proximity warning device responsive to the barometric altimeter and the altitude loss signal for detecting an excessive altitude loss and for providing a warning if the altitude loss exceeds a threshold value.

8. The warning system of claim 1 further comprising a switch for disabling the controller based on one or more flight conditions.

9. The warning system of claim 8 wherein the controller is disabled if the airspeed of the aircraft is greater than 40 knots.

10. The warning system of claim 8 wherein the controller is disabled if the total engine torque is below a threshold torque value.

11. The warning system of claim 8 wherein the controller is disabled if the barometric altitude is greater than 200 ft AGL.

12. The warning system of claim 1 further comprising first and second filters coupled to the output of the controller for filtering out noise signals, the first filter having a broader range than the second filter, the controller including a switch for automatically toggling between the first and second filters based on flight conditions.

13. The warning system of claim 12 further comprising first and second time constant functions, the first time constant function having a shorter time constant than the second time constant functions, the system further comprising an OR gate for toggling to the first time constant function if the aircraft is below 50 ft AGL and flying at a speed less than 40 knots.

14. The warning system of claim 1 wherein the controller comprises:

an engine power detector disposed to detect the power of the aircraft engine; and a control circuit configured to scale the barometric altitude rate based on the engine power.

15. The warning system of claim 14 further comprising at least two different time constant functions coupled to the output of the control circuit for adjusting the time constant of the controller, and a switch for toggling between the time constant functions based on flight conditions.

16. The warning system of claim 3 wherein the aircraft is a rotary wing aircraft and the total engine torque increases as the aircraft approaches the ground, the control circuit decreasing the barometric altitude rate signals substantially proportionally to the increase in total engine torque.

17. The warning system of claim 16 wherein the control circuit scales the barometric altitude rate based on the total engine torque and maximum and minimum torque values for the specific aircraft.

18. A warning system for a rotary wing aircraft comprising:

a barometric altimeter disposed to detect the barometric altitude of the aircraft;

a rate circuit coupled to the barometric altimeter for generating a barometric altitude rate signal;

a torque detector disposed to detect the total engine torque; and a controller coupled to the rate circuit and the detector, the controller adjusting the barometric altitude rate signal based on the engine torque.

19. A method for determining a barometric altitude rate of an aircraft comprising:

generating signals representative of the barometric altitude rate of the aircraft;

generating signals indicative of ground effects; and adjusting the barometric altitude rate signals based on said signals indicative of ground effects.

20. The method of claim 19 further comprising decreasing the barometric altitude rate signals to compensate for an apparent increase in barometric altitude rate caused by ground effects.

21. The method of claim 19 wherein the aircraft is a rotary wing aircraft, the method further comprising generating signals representative of the total engine torque of the aircraft and scaling the barometric altitude rate based on the total engine torque.

22. The method of claim 19 further comprising generating a ground proximity warning based on at least the barometric altitude rate of the aircraft.

23. The method of claim 19 further comprising disabling the controller if the airspeed of the aircraft is greater than 40 knots, if the total engine torque is below a threshold torque value, or if the barometric altitude is greater than 200 ft AGL.

24. The method of claim 19 further comprising providing a signal representative of the altitude loss of the aircraft, detecting an excessive altitude loss and, providing a ground proximity warning if the altitude loss exceeds a threshold value.

* * * * *

UNITED STATES PATENT AND TRADEMARK OFFICE
CERTIFICATE OF CORRECTION

PATENT NO. : 5,781,126

DATED : July 14, 1998

INVENTOR(S) : Noel S. Paterson, Gary A. Ostrom and Alden L. Loos

It is certified that error appears in the above-identified patent and that said Letters Patent is hereby corrected as shown below:

On the title page: Item

[60] Provisional application no.: 60/022,081, April 29, 1996.

Delete [April 29, 1996] and substitute therefore --July 29, 1996--.

Signed and Sealed this

Thirteenth Day of October 1998

Attest:

BRUCE LEHMAN

Attesting Officer

Commissioner of Patents and Trademarks